United States Patent [19]

Westrope et al.

[11] Patent Number: 5,721,832
[45] Date of Patent: Feb. 24, 1998

[54] METHOD AND APPARATUS FOR AN INTERACTIVE COMPUTERIZED CATALOG SYSTEM

[75] Inventors: Robert John Westrope, Toronto; Bruce Edward Martin, Mississauga; John Bernard Lyons, Richmond Hill, all of Canada

[73] Assignee: Regal Greetings & Gifts Inc., Toronto, Canada

[21] Appl. No.: 439,595

[22] Filed: May 12, 1995

[51] Int. Cl.⁶ ........................... H01J 13/00
[52] U.S. Cl. ............... 395/227; 395/210; 348/13; 379/92; 235/383
[58] Field of Search ............... 346/401, 403, 346/406; 380/25; 235/383, 385, 375, 380; 395/227, 210; 348/13, 55; 379/92

[56] References Cited

U.S. PATENT DOCUMENTS

| | | | |
|---|---|---|---|
| Re. 30,773 | 10/1981 | Glaser et al. | 235/379 |
| Re. 31,951 | 7/1985 | Johnson | 369/900 |
| 4,584,604 | 4/1986 | Nakagawa | 348/55 |
| 4,603,232 | 7/1986 | Kurland | 379/92 |
| 4,792,849 | 12/1988 | McCalley et al. | 358/86 |
| 4,816,904 | 3/1989 | McKenna | 395/13 |
| 4,972,504 | 11/1990 | Daniel | 395/210 |
| 5,053,956 | 10/1991 | Donald | 364/403 |
| 5,088,586 | 2/1992 | Isobe | 364/403 |
| 5,195,130 | 3/1993 | Weiss et al. | 379/98 |
| 5,253,341 | 10/1993 | Rozmanith et al. | 395/200 |
| 5,315,504 | 5/1994 | Lemble | 364/400 |
| 5,315,508 | 5/1994 | Bain et al. | 364/401 |
| 5,451,998 | 9/1995 | Hamkick | 364/403 |
| 5,475,585 | 12/1995 | Bush | 364/403 |
| 5,528,490 | 6/1996 | Hill | 364/403 |

OTHER PUBLICATIONS

"Electronic Shopping, Computer Catalogs"; Popular Science Jul. 1994, p. 41.

*Primary Examiner*—Thomas Mullen
*Assistant Examiner*—Albert K. Wong
*Attorney, Agent, or Firm*—Rader Fishman & Grauer PLLC

[57] ABSTRACT

The present invention relates to an improved method and apparatus for an interactive, computerized catalog system in which a customer can selectively access video and audio catalog data from a computerized catalog memory that permits a customer to peruse an entire catalog of products or services or select specific portions from specific catalogs or services and if desired place an order which is processed electronically and from which customer profile marketing data is selectively generated.

10 Claims, 5 Drawing Sheets

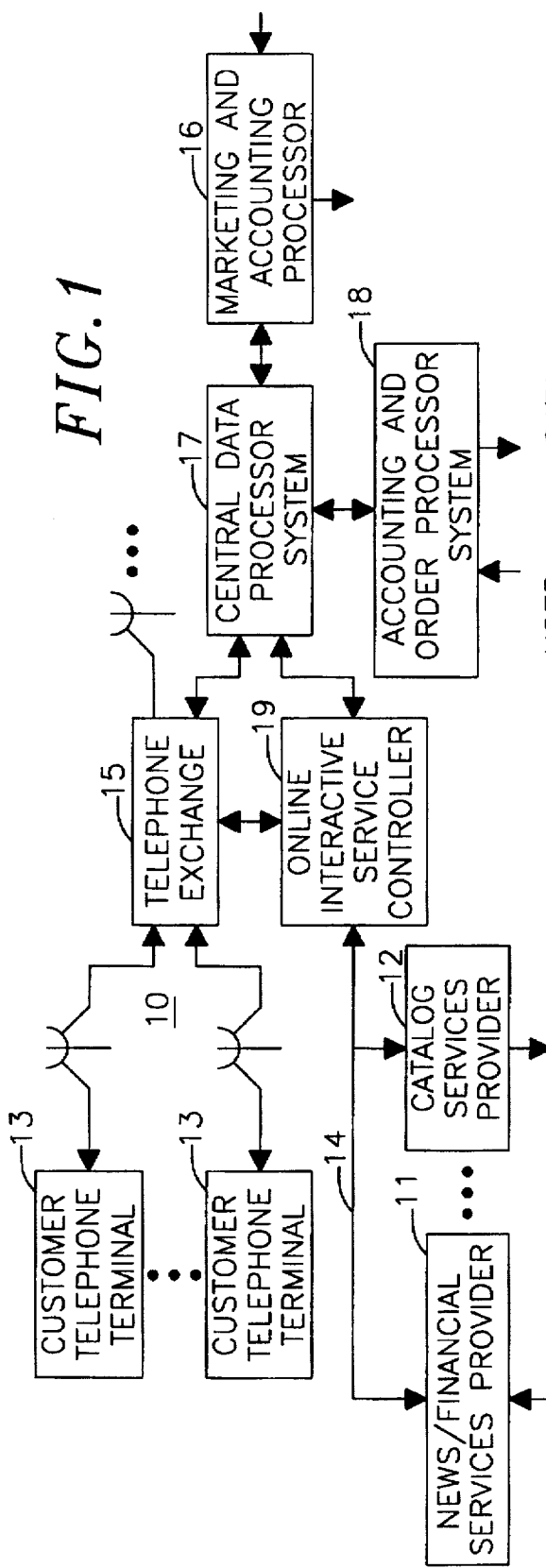
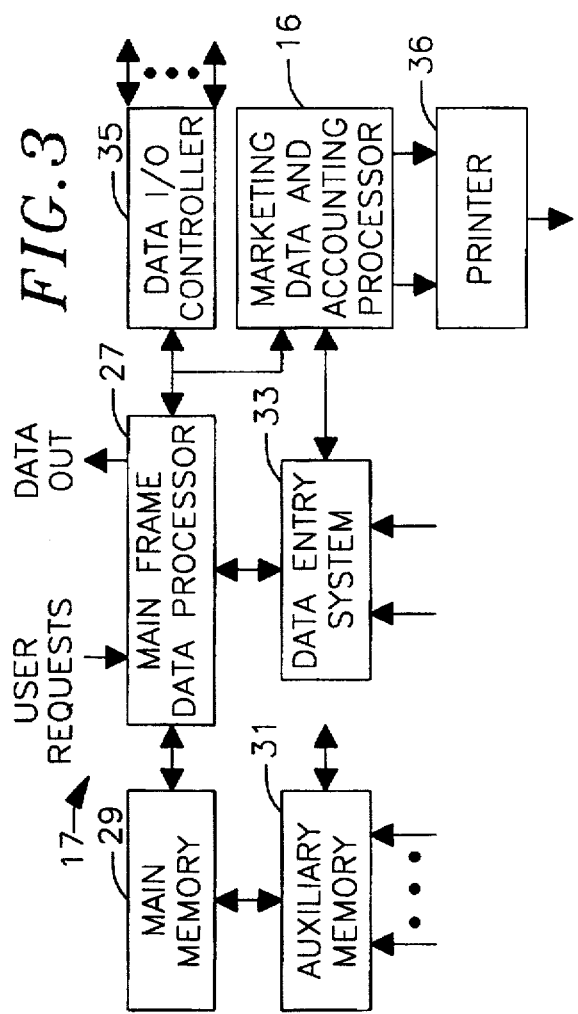
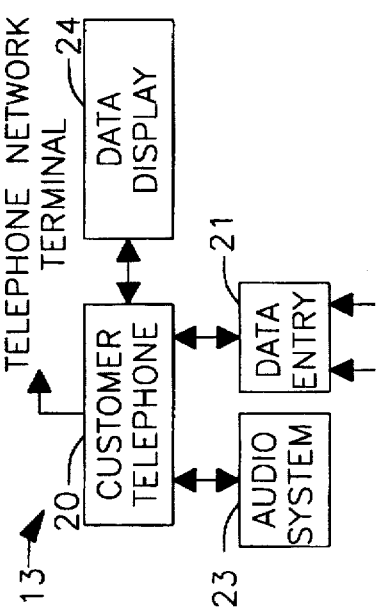

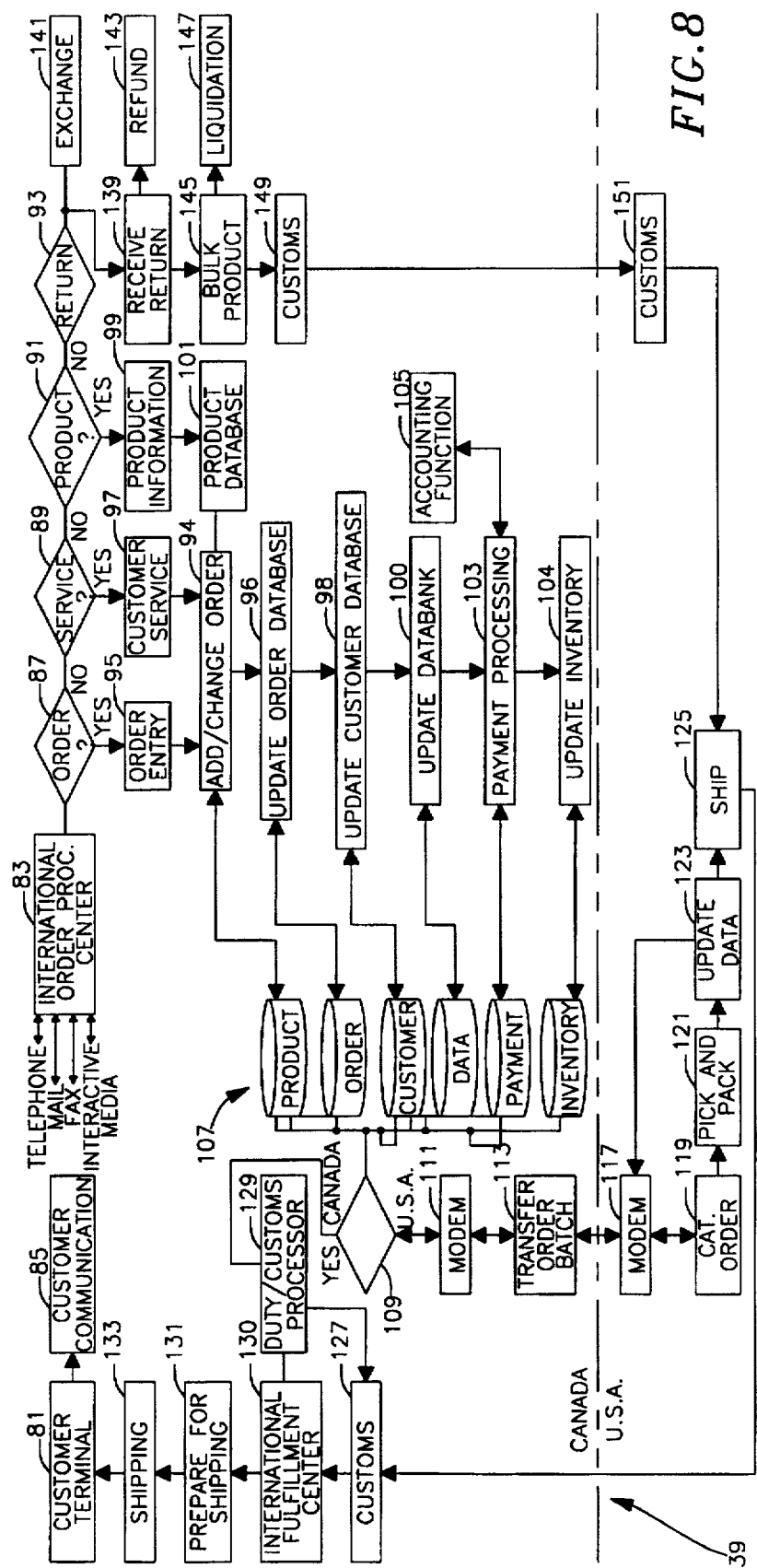

METHOD AND APPARATUS FOR AN INTERACTIVE COMPUTERIZED CATALOG SYSTEM

FIELD OF THE INVENTION

The present invention relates to an improved interactive computerized electronic catalog system and more particularly to an improved method and apparatus for an interactive catalog system selectively addressable by a customer controlled telephone terminal for selectively accessing prerecorded audio and video catalog data for selective products or services and in which as a by-product of such utilization customer market profile data is selectively generated.

BACKGROUND OF THE INVENTION

The structure and operation of several diverse types of catalog systems are well documented in the patent literature and in the marketing and more particularly in the direct marketing arts literature. One seeking a description of representative types of catalog systems and equipment should see: Prodigy System Manual; U.S. Pat. No. 5,253,341 entitled "Remote Query Communications System": U.S. Pat. No. 5,315,504 entitled "Electronic Document Approval System"; and U.S. Pat. No. 5,315,508 entitled "Label Generating and Data Tracking System for Processing Orders": or U.S. Pat. No. 4,792,849 entitled "Digital Interactive Communication System."

Merchandising a wide variety of products and services by printed catalogs mailed to large numbers of prospective customers is a very large and rapidly expanding commercial market in essentially every industrialized country in the world. For example, a 1991 study by the Canadian Direct Marketing Association reports that in the U.S. there were 8 to 10,000 mail order companies which generate more than $51.5 billion dollars in annual revenue. The 1991 study further reported that more than 55% of American adults had purchased goods or services from a catalog during the preceding year and approximately 26% of the Canadian adults had also purchased such services from a catalog company. Based on the respective U.S. and Canadian populations, the growth potential in each country for the catalog mail order business is substantial.

A recent article in the July 1994 issue of *Popular Science* magazine reports several U.S. companies are taking tentative steps to replace or supplement printed catalog materials with an electronic or computerized catalog. For example, a number of U.S. companies are reported to be test marketing a CD-Rom disc which includes digital catalog data for a number of popular U.S. retailers' catalogs. Onscreen catalog displays are beginning to appear in retail stores as an electronic variation of the free-standing catalog kiosk or catalog department. Other retailers are experimenting with floppy disc versions of catalogs which would permit potential users to browse electronic catalog data on their PC computers.

The principal disadvantages of these earlier mail order or electronic catalog systems includes limitations on how, when and where the electronic catalog data can be viewed by a potential customer. Further, these earlier systems generally require a separate or multi-step ordering process which are often cumbersome and time comsuming. Further, interactive cable TV type systems often require each subscriber to use a dedicated channel for viewing video product information without the ability of the potential customer to select specific type products or services individually.

SUMMARY OF INVENTION

It is an object of the present invention to provide an improved method and apparatus for an interactive, computerized electronic catalog system.

It is another object of the present invention to overcome the difficulties, shortcomings and inefficiencies presented by the prior art electronic catalog systems.

It is yet another objective of the present invention to provide an improved, cost efficient interactive electronic catalog process and system which provides efficient product and service selectivity to prospective customers and which selectively generates market profile data of user/customers.

These and other objects and advantages of applicants' improved method and apparatus for an interactive computerized electronic catalog system can best be understood by reference to the following detailed description in conjunction with the accompanying drawings wherein:

FIG. 1 is a logic block diagram of applicants' improved computerized interactive catalog system.

FIG. 2 is a schematic block diagram of a telephone network terminal device utilizable in accordance with applicants' improved interactive computerized catalog system.

FIG. 3 is a schematic block diagram of the central data processor system utilizable in accordance with another aspect of applicants' invention.

FIG. 8 is a logic flow diagram illustrating the sequence of operation of applicants' improved computerized catalog systems illustrated in FIGS. 1 and 4.

Figure 4:
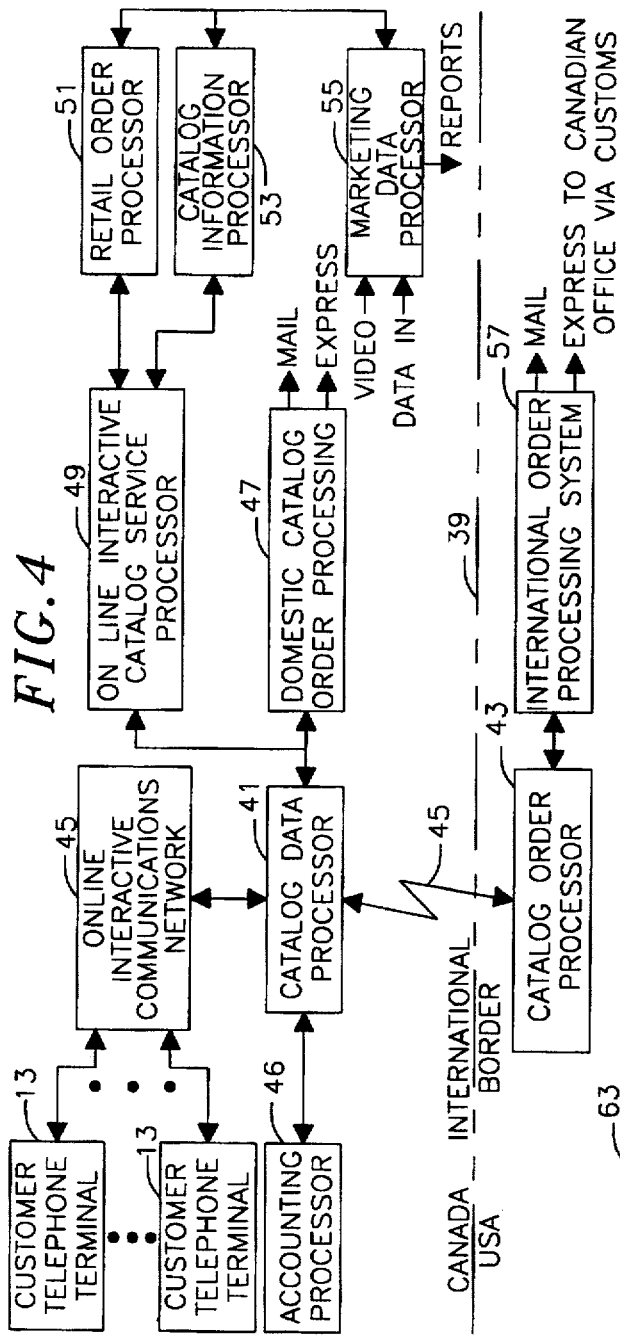
FIG. 4 is a logic block diagram of an interactive online catalog system utilizable across international boundaries in accordance with another aspect of applicants' invention.

The present invention relates to an improved method and apparatus for selectively transmitting and displaying at a customer/user's telephone terminal interactive catalog data selected by the user. Applicants' improved interactive system comprises a central data processor system for storing and indexing electronic catalog data, including graphic and audio message data, memory means for storing and selectively retrieving specific portions of a retailer catalog data specified by a user request, a communication link to selectively establish a communication path between a user's telephone terminal and the central data processing system in response to a user inquiry an online interactive service control processor responsive to user commands to control retrieval of specified catalog data identified in a user request, a user profile data processor for selectively generating customer profile data if authorized by the user/customer and order processing means responsive to a user order command for completing the accounting and order delivery tasks involved in fulfilling a user order.

DETAILED DESCRIPTION OF PREFERRED EMBODIMENTS

Referring to FIG. 1, there is shown a logic block diagram of an improved computerized, interactive catalog system in accordance with one aspect of applicants' invention. As shown, a telephone system 10 selectively connects a customer/user telephone terminal 13 with a telephone exchange 15 which may be of the type typically used in commercial telephone systems in the U.S. or Canada. In response to a customer dialing a predetermined assigned telephone number from his telephone terminal 13 which preferably is an 800 number used by businesses to permit customers/users to make a toll-free call to their business, the telephone exchange 15 connects the customer to the central data processor 17 which may, for example, comprise an IBM AS400 central data processor with an associated system memory and standard peripherals 16 and 18, for example an IBM model 3350 direct access disc storage array and 3380 controller which typically would provide several gigibytes of selectively addressable memory capable of storing digital video and audio catalog data. An online interactive controller 19, which may for example comprise an IBM AS400 I/O controller type is arranged to selectively couple input data to the central data processor 17 from terminals 11 and 12, which may comprise IBM PC XT computers coupled to the controller via any communication path 14, for example a telephone line or a modem in the terminal not shown.

In response to a customer initiating a request by dialing a predetermined 800 telephone number, the telephone exchange 15 signals the central data processor 17 that a user has requested service and the processor 17 in response thereto retrieves the digital catalog data selected by the user inquiry for transmission via the telephone exchange 15 and communication link 10 to the user's terminal 13. As will be hereinafter more fully described in connection with FIGS. 6, 7 and 8, the user may select, for example, from a variety of catalogues or services from a menu transmitted from the central data processor for display at the user's telephone terminal 13. The user may select a specific catalog or service description from the menu, not shown, or may instead choose to select an entire catalog or list of services which the user can then browse through at his/her own speed. Alternatively, the user may specify any specific catalog product or service by name, category or number and the central data processor 17 would then transmit only the desired product or service data for display at the user terminal 13. In conjunction with each customer request received by the central data processor 17 from a user terminal 13, the central data processor, as will be hereinafter more fully explained in conjunction with FIGS. 7 and 8, the order processing system 18 and merchandising data and accounting processor 16 are activated. Specifically if a customer inquiry generates an order for a specific product listed in a retailer catalog, for example Regal Greetings & Gifts item #101, then the accounting and order processor 18, which for example may be an IBM PC XT computer with a 40-megabyte hard drive and associated peripherals and features, which are well known to those skilled in the computer arts, would be activated to process that order. For example, an order processor 18 may be located at Regal's warehouse in Ontario or may be coupled online via a normal telephone network to a site of the central data processor 17. The mail order processing procedures, as are known to those skilled in the direct marketing arts, include a credit approval procedure such as a credit card authorization check and a determination as to what federal or provincial or state taxes, if any, are applicable and the authorization for packaging and shipping the selected product or service to the address specified by the user/customer in his order. As will be hereinafter more fully described in connection with FIGS. 6 and 7, the user/customer may elect to have his/her name deleted from the computer file after the order is completed by electronically activating a marketing data delete command code which will act to inhibit the inclusion of that particular user's name from any marketing data generated by the marketing data processor 16, which may, for an example be an IBM PC operatably coupled to communicate with the central data processor via any standard means, such as coax or twisted pair cable.

Referring now to FIG. 2, there is shown a logic block diagram of a consumer telephone terminal 13 usable in accordance with applicants' invention. The telephone terminal 13 comprises a standard customer telephone unit which may be hard wired or portable and has a standard commercial handset 20 and touchtone pad 21, a display unit 24 preferably capable of displaying alphanumeric and graphic data and an audio unit 23, such as the speaker phone arranged to free the user from the normal telephone handset. There are several commercially available screen phones, for example Northern Telephone's Vista 300 phone or Bellcore's Mediacom System which both include digital data terminal features utilizable in accordance with applicants' improved interactive catalog system.

Referring now to FIG. 3, there is shown a logic block diagram of the central data processor system 17 utilizable in accordance with another aspect of applicants' invention. As described in conjunction with FIG. 1, the storage and selective transmission of electronic catalog data is controlled by data processor mainframe 27 which, for example, may comprise an IBM 4300 processor which is operationally coupled to a main memory 29 which may comprise an IBM 3350 direct access disc file system and an auxiliary memory 31 which may also comprise additional disc file or tape drive memory systems, as is well known to those in the computer arts. Electronic catalog data is digitized in a data entry system 33 which may comprise, for example, a document scanner or encoder which converts graphic data into digital video data and is then stored in the main memory 29 via either the auxiliary memory 31 or the mainframe processor 27. As will be hereinafter described more particularly with reference to FIGS. 4 and 5, the electronic catalog data is utilized by the data processor mainframe to generate an appropriate catalog menu for selective transmission to a user to briefly describe in varying levels of detail the catalog and service data available under a particular item.

The communication between the mainframe processor 27 and the other units of the system are coupled through I/O processor 35 which, for example, may be an IBM 4300 I/O controller which has a plurality of I/O data channels. As shown, the marketing data and an accounting processor 16 may be directly linked to the mainframe processor as shown or alternatively could be coupled via the I/O controller 35 to communicate thereby with the mainframe processor 27 as requested. As described above in connection with FIG. 1, the central data processor system 27 may be one of many commercially available computers, for example an IBM RISC 6000 processor or Compact System PRO which has, for example, a 64-megabyte RAM and which can accommodate several megabytes of disc drive memory.

Referring now to FIG. 4, yet another aspect of applicants' improved interactive computerized catalog system is shown which incorporate unique and novel features to facilitate cross-border international catalog transactions. Broken line 39 symbolizes a portion of the U.S.-Canadian border with catalog order processor 41 being located in Canada and catalog order processor 43 being located in the U.S. and with a two-way full duplex communication link 45 connecting the U.S. order processor 43 with the Canadian order processor 41, which respectively may be of the various commercial types described above.

For many reasons, Canada represents a relatively large untapped source of catalog buyers from the U.S. mail order companies' perspective. For example Canada is very large and more than ⅔ of Canadians live within 150 miles of the U.S. Canadian border. In addition because of spillover advertising and of their close relationship with the U.S. many Canadians truly appreciate American quality and product values. However, as promising as doing business in a foreign country seems, expanding mail order type catalog businesses into Canada isn't as easy as mailing into neighboring states. The fact is, despite its many similarities. Canada is a foreign country with a border to cross and Canada, as a foreign country, has its own federal, provincial and local laws and regulations. In addition, like their American counterparts, many Canadians clearly prefer merchandise directed to their specific needs, priced in their own currency and which does not necessitate dealing with customs and duty charges. For these and other reasons, for a U.S. company to circumvent these difficulties and establish a significant mail order catalog business in Canada would require a substantial expenditure to create the operational infrastructure and develop the necessary expertise required to do business in a foreign country. In addition, any foreign company would face substantial barriers to entry and be particularly concerned about a potential customer's reluctance to purchase from a foreign catalog company. Customers in such situations would rightfully have concerns about duties, taxes and exchange rates which could render the landed price elusive and surprising. In addition, many customers or potential customers would have a fear of dealing with a foreign company with no local stake in the market place or locally available customer service facility.

While the system in FIG. 4 illustrates a U.S. catalog retailer doing business in Canada through a turnkey type operation offered by a Canadian company illustrated having catalog order processor 41 and the associated catalog system being operated as a resident Canadian company, applicants' system is equally applicable for any international cross-border transaction. In effect as illustrated, the Canadian company would conduct a retail catalog line of business in Canada for its American affiliate company. The American company's catalog data as viewed by Canadian users would be a "Canadianized" version of the American catalog with prices restated in Canadian dollars and with other appropriate marketing changes to better fit the U.S. company's catalog and product to the Canadian market. Thus, the Canadian company would interface with its Canadian customers and represent its U.S. affiliate. As will be further described in connection with FIG. 8, the Canadian company would warrant and perform all customer services and assume all potential liability for taxes, custom duties and Canadian business expenses such as electronic catalog publication, distribution and delivery costs, etc. for products sold in Canada.

With regard to FIG. 4 it will be understood that the customer telephone terminals 13 are similar in structure and function to those described in connection with FIG. 1. The prospective customer would initiate system operation by dialing a predetermined access number from his/her telephone terminal, e.g., an 800 number, and would be connected through the communication network 45 and, as described in connection with FIG. 1, to the catalog service processor 41 which is similar in structure and function to the central data processor 17 of FIG. 1. The menu of catalogs, catalog products and services available on the system is automatically transmitted from the catalog processor 41 to the subscriber telephone terminal 13 in response to a user's initial request, in a manner similar to that described in conjunction with FIG. 1. The customer then has the option to select a particular catalog or service or specify particular products or services from the menu which lists the various types of catalogs, products and services offered on the system. The electronic video and audio catalog data responsive to the user request will then be automatically transmitted from the catalog data processor 41 via the communication link 45 to the requestor user's terminal 13. If the subscriber/user selects a particular catalog or description of services to be mailed to his/her address, by selecting appropriate options on the telephone terminal 13, the catalog data processor 41 would signal catalog order processor 47, which is structurally and functionally equivalent to the data processor 17 described in conjunction with FIG. 1, and order processor 41 requests printed catalogs or materials ordered be processed and mailed to the requestor. Alternatively, if the user requests a specific catalog product or service, for example a jacket or sporting events tickets, following the customary order processing procedures described in conjunction with FIGS. 1 and 8, including financial clearance or form of payment authorized by accounting processor 49, the order would be processed by domestic order processor 51 in a manner similar to that described above in connection with FIGS. 1 and 8.

If the catalog selected by the user/subscriber involves a product or service listed in the "Canadianized" catalog data of the U.S. company affiliate, several additional process steps are required to effectuate the ordering by a Canadian customer of a U.S. based company's product for delivery to the Canadian customer. For a Canadian user to request a U.S. based product or service in accordance with this aspect of applicants' invention, the financial clearance and payment is an initial step as described in connection with FIGS. 7 and 8. After payment has been authorized and finalized, the Canadian order processor 41 communicates with the U.S. order processor 43 via communication link 45 and the order is finalized or placed with the U.S. company. All order processing procedures and order entry instruction originate at the Canadian order processor 41 in this example. The U.S. order processor which is structurally and functionally equivalent to that order processing system 17 of FIG. 1 then signals its order processing and fulfillment system 57, which packages the ordered products or items for that customer's specific order. The assembled orders for a given time period—e.g. each day, preferably would then be bulk packaged and shipped to the Canadian affiliate with the Canadian affiliate being solely responsible for Canadian customs, duties, taxes etc. and handling all transportation duties to introduce the assembled packaged orders into the Canadian delivery system, e.g. mail or express mail, as might be appropriate.

As will be understood by those skilled in the direct marketing and catalog distribution arts, a two-way catalog system would merely require the duplication of the structure and function of the online interactive system illustrated in FIG. 4 on the Canadian side on the American side. Each company would then act as its neighbor's local turnkey catalog operation with reciprocal functions and tasks.

Figure 5:
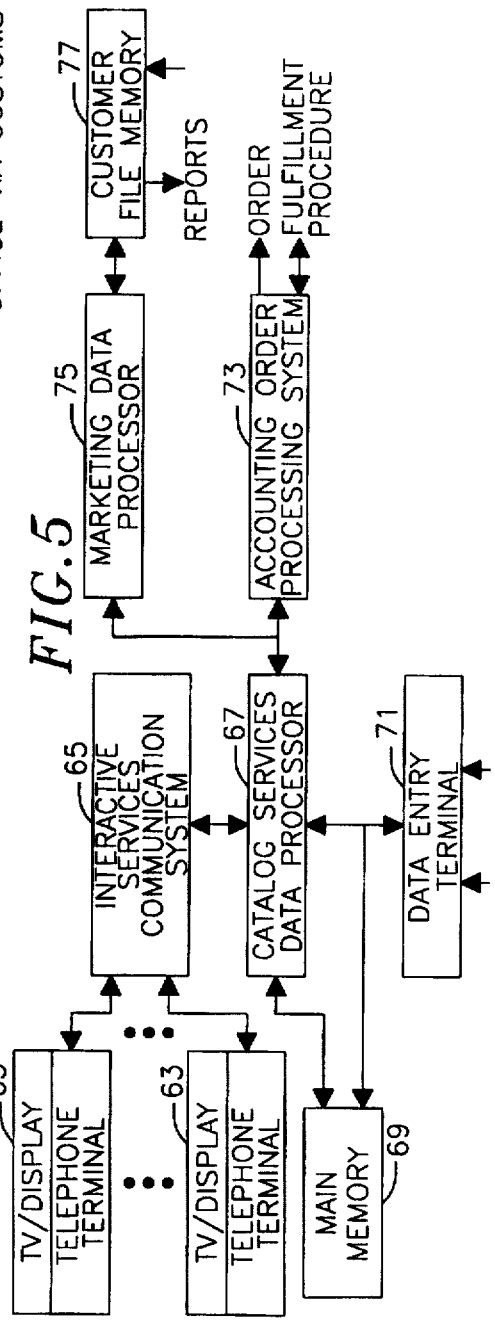
FIG. 5 is a schematic block diagram of yet another aspect of applicants' improved interactive online catalog system.
Figure 6:
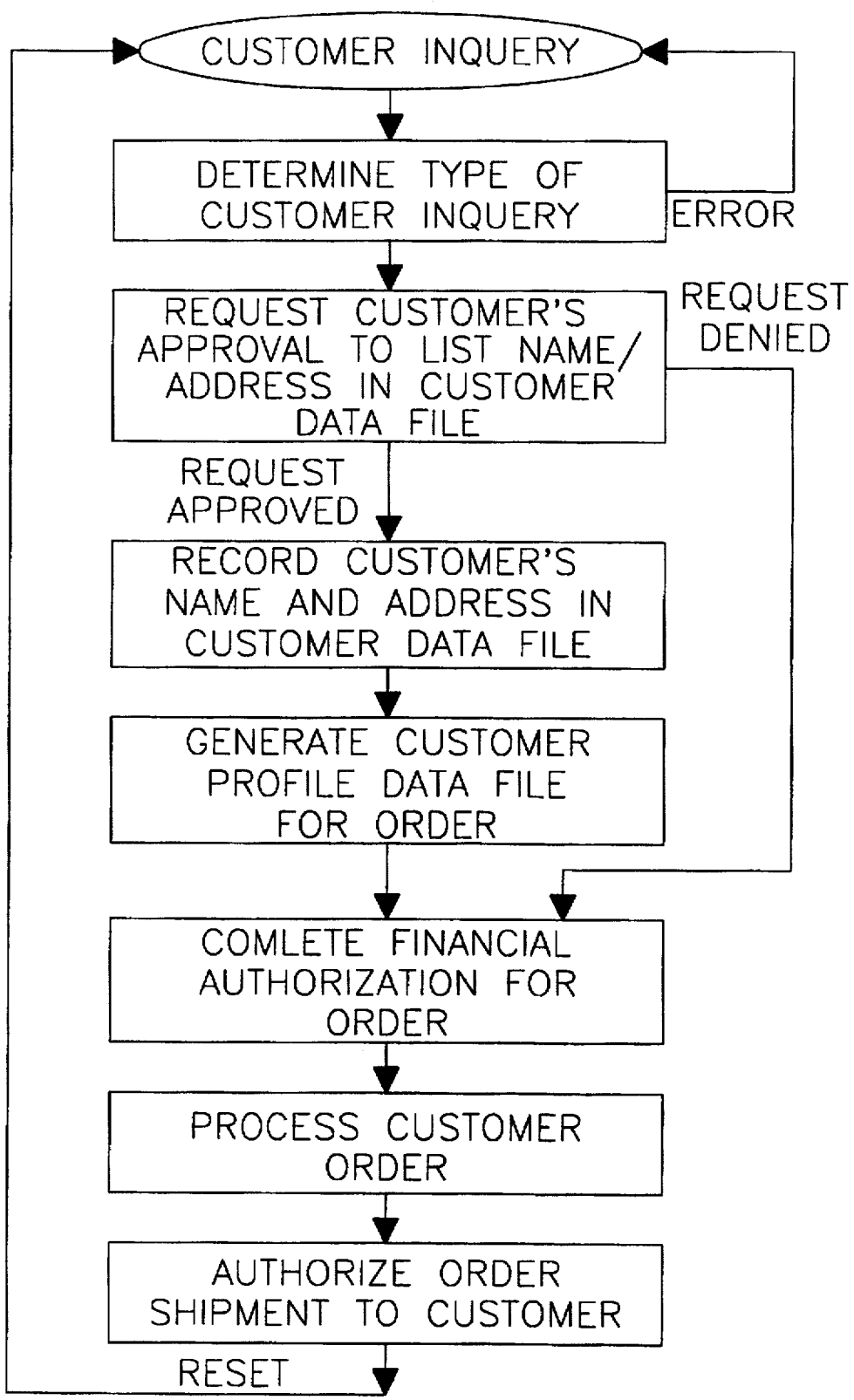
FIG. 6 is an algorithmic logic flow diagram illustrating the sequence of operating steps of applicants' improved domestic computerized interactive catalog system illustrated in FIG. 1 for selectively generating customer profile data.
Figure 7:
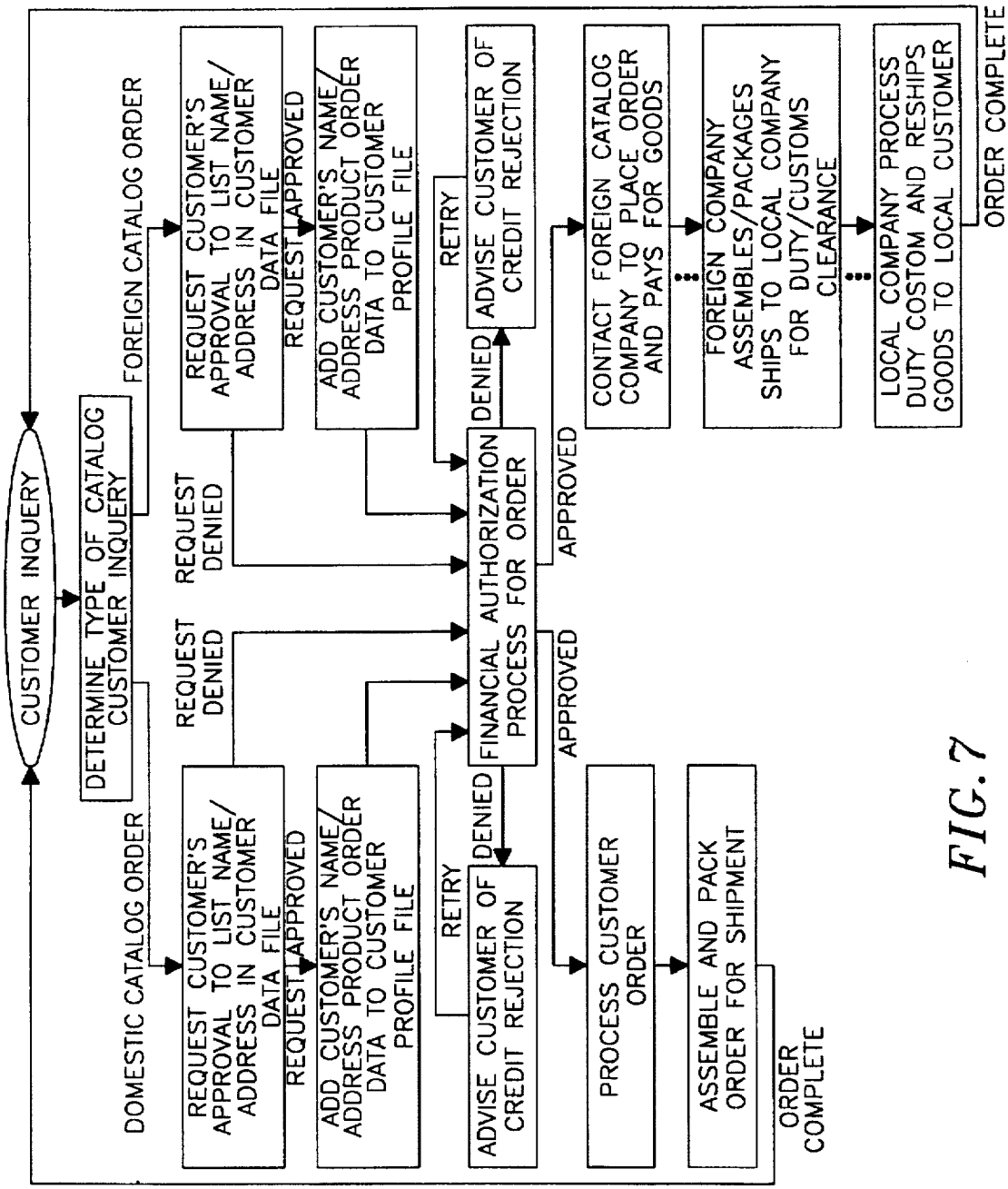
FIG. 7 is an algorithmic logic flow diagram of the operating steps of applicants' improved international computerized interactive catalog system illustrated in FIG. 4 for selectively generating customer profile data.

Referring now to FIG. 5 in conjunction with the logic flow diagrams illustrated in FIG. 6 and 7, there is illustrated another embodiment of applicants' improved interactive electronic catalog process and system which, for example, could be operated in a single hotel, or within a chain of geographically dispersed hotels or on a system of carriers, for example cruise ships, trains or airplanes. As was described above in conjunction with FIG. 1, a user/customer would establish a communication path from a user TV terminal 63 through the communication system 65 for example a PBX telephone exchange network, marketed by AT&T, Rohm and other companies, within a hotel to a catalog service data processor 67, which is functionally and structurally similar to the apparatus described in connection with FIGS. 1 and 4. The user terminal may be the type described in conjunction with FIG. 1 or alternatively may be an interactive hookup with a touch tone telephone and a cable TV system to selectively display the requested catalog data and menu etc. on a particular TV channel. As described in connection with FIG. 1, the catalog data processor 67 has a main memory 69 and a data entry terminal 71 which may be of the types described in connection with FIGS. 1 and 4. The electronic catalog data would be entered via data terminal 71 and stored in selectable memory locations in the main memory 69. Preferably applicants' system would include electronic catalog data for a plurality of different catalogs from different companies. In addition, data entry terminal 71 may be utilized to enter special on-sale or promotional messages, either audio and/or visual, or a combination thereof. As has herein described in conjunction with FIGS. 1, 6, 7 and 8, the user may browse through various catalogs or may select an individual catalog or request specific product categories or services by type or select a product by catalog product number. If a user elects to order a specific product or service, this is done under menu control at a user terminal and the menu would prompt the user to enter the appropriate order data codes via, for example, a touchtone telephone pad on the user terminal 63. In response to receipt of such user order data codes, the catalog data processing signals the accounting and order processor 73, which is similar in function and structure to the order and accounting processor of FIGS. 1 and 3 to exercise the appropriate order processing requests to clear the customer/user's financial payment authorization and initiate the order fulfillment procedure to have the ordered products assembled and mailed to the address directed by the user/customer for that particular transaction. As herein above described in conjunction with FIGS. 1 and 3, the catalog data processor 67 in response to a customer/user order signals the marketing data processor 75, which is similar in structure and function to the marketing data processor described above in connection with FIGS. 1 and 4, to generate, unless the customer does not so authorize, customer profile marketing data in file 77 as described in FIGS. 6, 7 and 8. Accounting and order processor 73, which is structurally and functionally equivalent to the accounting and order processor described in FIGS. 1 and 3, initiates various accounting, financial payment authorization and/or assembly and shipping procedures as described in conjunction with FIGS. 6, 7 and 8. Accounting and order processor 73 as illustrated in FIG. 8 also in response to a command from the central data processor 67 initiates a software or program routine procedure to generate commission data for accumulating a commission file entry for the individual host hotel or site of the interactive catalog subsystem from which a particular order originated. As illustrated in FIG. 5, this differentiation of order source in order to develop an accounting commission credit for the party or entity from which site or which is responsible for originating a specific order can be accomplished by utilizing special codes for product orders originating from certain terminals, i.e. a code transmitted by the terminals 63 or alternatively by utilizing a prefix or suffix number or alphanumeric associated with a particular system host site which in conjunction with the catalog product number uniquely identifies the site as an originator of a specific product or service order.

Referring now to FIG. 6, there is shown a composite logic flow diagram which illustrates the selective generation of customer profile data, if authorized by the customer, when placing an order on applicants' improved catalog system.

As discussed above with reference to FIGS. 1 and 3, a customer inquiry is generated in the improved catalog online interactive system by placing a telephone call to a predetermined number, e.g. an 800 number. The customer's inquiry message upon receipt by the central data processor of applicants' improved catalog system results in the generation and transmission to the customer of a menu of available catalogs and services. Preferably as part of the initial menu displayed at the customer's telephone terminal, a request for the customer's approval to include the customer's name and address in a customer data file is made. If the customer signals his approval, e.g. by depressing an appropriate key at the customer terminal, the customer's name and address will be automatically added to the customer data file. In addition, if authorized by the customer, the customer's profile data would be updated to include any order placed at that time. As shown in FIG. 6, if the customer does not approve the request but signals by the appropriate selection of a specified key on the customer's telephone terminal that the request is denied, then the customer's name and address and order data profile are not performed. In either event following the process by the system of the customer profile data request which may be approved or denied by the customer, the process continues and the financial authorization for a particular customer in connection with the order placed would be initiated. As is known to those skilled in the retail catalog business, the financial authorization generally involves the use of a credit card and the financial authorization request for the customer is dependent upon the dollar amount of the order placed. Assuming the financial authorization is approved, the catalog order process continues with the processing, assembling and packaging of the order for shipment to the address specified by the customer.

Referring now to FIG. 7, there is shown a logic flow diagram which details the parallel paths for processing either a domestic order for fulfillment within the country of origin or alternatively the path for fulfilling a foreign order where the goods to be sent are offered for sale by a foreign company through the catalog listing on applicants' international catalog system. As illustrated in FIG. 7 the lefthand side of the logic flow diagram is similar in process, structure and operation to that illustrated in FIG. 6 with the request for customer approval to list the customer's name and address in the customer data file being undertaken after the catalog system processor determines the type of customer inquiry. The initial determination by the catalog system processor would identify the customer inquiry as involving a domestic catalog order or alternatively a foreign catalog order. In either event, the customer has the option of approving or denying the system request for inclusion of the customer's name in the customer profile data file. After an order has been placed, the catalog system then would initiate the financial authorization process for a particular customer's order. If there are any problems encountered in the credit authorization procedure, the customer would be so advised and the system would be instructed by the customer to retry the financial authorization process either with a different credit card or correcting any mistake which was contained in the original customer data inputted into the system. As shown in FIG. 7, the domestic catalog order, following the financial authorization process approval, would proceed to fulfill the customer's order by notifying the appropriate warehouse to gather the products ordered by the customer and assembling and packing the customer's order for shipment to the customer.

Again with reference to FIG. 7, the foreign catalog order processing has several additional steps necessitated by the transfer of the customer's order to the foreign catalog company for processing after the financial transaction proposed by the customer order has been approved. The local catalog system, as herein above described in connection with FIG. 4, following completion of the formalities of the customer order communicates the order data via an appropriate communication channel, not shown, to the foreign-based catalog company with the guarantee of payment being made by the local company. The foreign company would then process the order by assembling and packaging the products ordered for shipment to the local catalog company following clearance of the shipment through local custom authorities. The local catalog company would then process the necessary regulatory paperwork to clear the shipment through customs and repackage the goods for shipment to the local customer. In the case of a foreign catalog, just as in the case of the domestic catalog, the local user looks to the local catalog company as the company handling the transaction on the customer's behalf. With the applicants' improved system, there is no delay or hassle encountered by the customer due to foreign duties and customs clearance and any complaints are handled locally by the local catalog company.

Referring now to FIG. 8 there is shown a logic flow block diagram of the process and system apparatus for applicants' improved online interactive catalog system for combined domestic and international operations. As herein above described in connection with FIG. 4 dotted line 39 indicates a portion of the border between the United States of America and Canada with a majority of the system in the illustration being located in Canada.

The operation of the interactive catalog system is initiated by a customer/user making contact via the customer terminal 81 with the international order processing center processor 83 via a communication link 85. As illustrated, the customer communications from terminal 81 may take the form of telephone, mail, fax or other interactive media contact. The initiation of the customer inquiry when properly received by the data processor 83 results in the case of the telephone and fax modes operation in the origination at the data processor 83 of a product/service menu which is communicated via the communication link 85 to the customer terminal 81. Assuming a valid system user inquiry, the data processor 83 which may be of the type described above then determines what type of customer request is involved which is illustrated by the series of decision blocks 87, 89 and 91 which correspond with a customer request to place of order, a customer request for service and a customer product request or return. In each of these instances the inquiry is routed through the order entry, customer service, product information or product return routines illustrated by blocks 95, 97 and 99. Each of the respective categories of customer inquiry, when properly recognized by the data processor 83, would initiate the order entry, customer service, product information request or product return subroutines as illustrated. The order process then follows the steps of order entry, processing, updating the order data base, updating the customer data base and updating the data bank and inventory memories 107 as shown graphically in blocks 94, 96, 98, 100 and 104. As part of the order processing a payment processing 103 which for example involves the types of steps herein above described in connection with FIGS. 1 and 4 and the appropriate accounting function as described by block 105 is initiated. The various data processing functions communicate with an array of data files 107, which for example may comprise an array of disc files of the type IBM 3350 or similar head per track magnetic memory units.

Following the processing the order a decision is made whether the order is a domestic, e.g., Canadian, order or the request involves an American manufacturer's catalog. As illustrated, if the product request involves a U.S. catalog company's product, appropriate data communications, e.g. via decision logic 109 and modem 111 and transfer order batch logic 113 which are coupled with similar equipment herein above described through a communication 115 linking the Canadian catalog center with its companion U.S. catalog center 119. The U.S. catalog center would then accept the order and process the order by selecting the products, updating the data and shipping the product to the customer by appropriate means 117, 119, 121, 123 and 125 across the U.S. Canadian border to the Canadian customs illustrated as block 127. Thereafter the clearance of the shipment through customs would be handled by the Canadian catalog company duty/customs processor 129 and the customer's order package would clear customs and be forwarded to the international order fulfillment center illustrated in block 129. The product would then be prepared for domestic shipping 131 and given to an appropriate carrier 133 for delivery to the customer as illustrated in the block flow diagram.

Alternatively, if the order as processed and described above involves a domestic, Canadian catalog company order, then the order would be directly sent to the fulfillment center 130 which would then prepare the order for shipment 133 to the customer.

As is known to those skilled in the retail catalog arts, a small portion of retail catalog transactions generally involve return of goods under a warranty or customer dissatisfaction situation. If the customer inquiry as described above involved a return product, the process is illustrated in the logic flow diagram involving the product return routine 139, exchange 141 and refund 143 to be credited to the customer and the determination as to whether the received returned goods are to be exchanged 141 or returned to the center, e.g. for example the wrong size or color was ordered. The process would involve the updating or changing of the order, the return of the goods with a determination as to whether a refund or new product was to be shipped. Bulk products 145 are normally not returned but sent to an appropriate warehouse for liquidation 147. If the original transaction involved an international transaction, the product would be repackaged for shipment to customers through customs 149 which would then arrange for shipment to the customer.

The foregoing description of applicants' improved interactive catalog process and system is illustrative only and many modifications may be made without departing from the scope of their invention as claimed below.

What is claimed is:

1. An improved interactive computerized catalog process comprising the steps of:

storing digitized graphic catalog data in a selectively addressable computer system memory, generating a menu of catalog products and services comprising catalog data available for selective viewing at any user's telephone associated terminal screen, establishing a selective communication link initiated by a user between said user's telephone terminal and said computer system, transmitting said menu of catalog products and services data to a user's telephone terminal in response to a user's initial request, transmitting from said computer system such catalog data which corresponds to said user's product and services request signal, requesting user authorization to include data regarding an order transaction in a customer profile marketing data file, initiating an order processing sequence, including a user initiated financial payment authorization process, to permit a user to enter from a user telephone terminal an order to be processed and delivered in response to said user's order, and enabling a user when placing an order to selectively elect to be included in or to be excluded from said customer profile marketing data file created as part of a completed catalog product or services order transaction.

2. The improved computerized catalog process of claim 1 including the additional step of generating a customer user profile marketing data file for all users electing to be included in such data file.

3. The improved computerized catalog process of claim 2 including the additional step of separating the data in said customer profile marketing data file by type of products or services ordered and by the types of catalog data requested.

4. The improved computerized catalog process of claim 1 including the additional steps of:

generating a customer profile marketing data file which is subdivided by the type of product ordered and the types of catalogs requested, and generating a list of customer names and addresses by a predetermined geographic breakdown.

5. An improved interactive computerized catalog system comprising:

central data processor means for storing and selectively addressing digitized graphic catalog data, a plurality of customer terminal means for displaying alphanumeric data during interactive communications between the terminal and central data processor means, switchable communication means activated by individual ones of said plurality of customer terminal means for selectively interconnecting ones of said plurality of customer terminal means with said central data processing means, order entry processing means responsive to order request data and payment authorization data entered from one of said plurality of customer terminal means for initiating an order entry process, prompter means for requesting user authorization to include data relating to the order in a marketing, data file, and customer profile data processor means responsive to said prompter means and authorization commands entered via ones of said plurality of customer terminal means for selectively generating a marketing data file as authorized by a particular customer as part of orders processed by said order entry processor means.

6. The improved interactive computerized catalog system of claim 5 wherein said central data processor means further includes data entry means for selectively entering audio and graphic advertisement data relating to particular catalog products or services available for order on said catalog system.

7. The improved interactive computer catalog system of claim 5 wherein said customer terminal means comprise display means for displaying alphanumeric and graphic data and further including data entry means including a key pad for entering alphanumeric data for transmission to said central data processor means.

8. An improved computerized interactive computer system catalog process comprising the steps of:

recording a plurality of individual retail catalog product data in selectively addressable computer memory means of said computer system, selectively connecting ones of a plurality of geographically dispersed customer terminals means to said computer system in response to a request from an activated customer terminal means, generating a menu of catalogs, catalog products and services available through said interactive catalog system for viewing at individual ones of said customer terminal means, accessing said catalog data in response to a customer terminal means request, sending to a requesting customer terminal means catalog data selected from said catalog data corresponding to a customer's request, processing ordered products or services selected by a customer's order sequence and customer financial payment authorization data transmitted from a customer terminal means to said computer memory means, enabling a user when placing an order to selectively elect to be included in or to be excluded from a customer profile marketing data file created as part of completed catalog product or service order transactions, identifying the originating site or region for each customer terminal means ordering products or services on said system, and generating an accounting record of products or services orders and commissions due for each order originating site or region for such product or service orders.

9. The improved computer catalog process of claim 8 additionally including the step of selectively generating a customer profile market data file based upon the types of catalog data requested by each customer provided such customer has authorized such data be utilized in a customer profile market data file as part of the order entry process.

10. The improved computerized catalog process of claim 8 additionally including the steps of:

permitting the customer to selectively elect to be included in or excluded from the customer marketing data file each time an order is placed, and generating a list of customers names and addresses for each order processed provided such customer has elected and authorized such customer profile market data file.

\* \* \* \* \*